(12) United States Patent
Son

(10) Patent No.: US 9,305,054 B2
(45) Date of Patent: Apr. 5, 2016

(54) SYSTEM AND METHOD FOR EXTRACTING ANALOGOUS QUERIES

(71) Applicant: ESTsoft Corp., Seoul (KR)

(72) Inventor: Kun-Young Son, Seoul (KR)

(73) Assignee: ESTsoft Corp. (KR)

( * ) Notice: Subject to any disclaimer, the term of this patent is extended or adjusted under 35 U.S.C. 154(b) by 247 days.

(21) Appl. No.: 13/868,066

(22) Filed: Apr. 22, 2013

(65) Prior Publication Data

US 2013/0282754 A1   Oct. 24, 2013

(30) Foreign Application Priority Data

Apr. 23, 2012  (KR) .................. 10-2012-0041848

(51) Int. Cl.
  *G06F 17/30*   (2006.01)
(52) U.S. Cl.
  CPC ................ *G06F 17/30477* (2013.01)
(58) Field of Classification Search
  CPC ................................................ G06F 17/30477
  USPC ........................................................ 707/769
  See application file for complete search history.

(56) References Cited

U.S. PATENT DOCUMENTS 8,244,749 B1 *  8/2012  Das et al. .................. 707/765

FOREIGN PATENT DOCUMENTS

KR    20100029581 A    3/2010
KR    101096285 B1    12/2011

* cited by examiner

*Primary Examiner* — Huawen Peng

(57) ABSTRACT

A system for extracting analogous queries is disclosed. The system includes a search query extracting module, a query pair extracting module, and an analogous query extracting module. The search query extracting module creates a per-user search query DB by reading search queries inputted by users from a search log DB that contains user device identifiers, search queries inputted from user devices, and information about time when the users request a search. The query pair extracting module creates a per-user query pair DB by extracting, from the per-user search query DB, permutations of different two search queries among search queries inputted by a specific user. The analogous query extracting module reads query pairs having a specific query in the per-user query pair DB, and creates analogous queries by extracting counterparts of a specific query from the query pairs. The analogous queries are provided in response to a search request for a specific query from the user device.

4 Claims, 4 Drawing Sheets

FIG. 3

| User Identifier | Search Query | | | | | | |
|---|---|---|---|---|---|---|---|
| UID 1 | Sparrow | Pigeon | Eagle | Cell-phone | ・・・ | Marriage | Office |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| . | . | . | . | . | . | . | . |
| UID X | A | B | C | D | ・・・ | Y | Z |

FIG. 4

| User Identifier | Query Pair |
|---|---|
| UID 1 | (Sparrow, Pigeon) , (Sparrow, Eagel) , (Sparrow, Cellphone) , · · · (Sparrow, Marriage) , (Sparrow, Office) (Pigeon, Sparrow) , (Pigeon, Eagel) , (Pigeon, Cellphone) , · · · · (Pigeon, Marriage) , (Pigeon, Office) · · · · · · · · (Office, Sparrow) , (Office, Pigeon) , (Office, Eagel) , · · · · · · · · (Office, Marriage) |
| · · · | · · · |
| UID X | (A, B) , (A, C) , · · · · · · · · (A, Y) , (A, Z) · · · · · · · · · · (Z, A) , (Z, B) , · · · · · · · · (A, Y) , (Z, Y) |

SYSTEM AND METHOD FOR EXTRACTING ANALOGOUS QUERIES

BACKGROUND OF THE INVENTION

1. Field of the Invention

The present invention relates to a search service technology using a communication network such as the Internet and, more particularly, to an analogous query extracting system and method capable of providing correlated analogous queries to a user by using log information of a user device.

2. Description of the Related Art

In a normal search service using a communication network such as the Internet, when a user enters a search query, a search engine searches websites, news, documents, etc., containing the search query therein or multimedia contents, such as images and videos containing the search query as their file names. This search result is then returned to the user in response to user's search query.

Recently, in order for users to more quickly and exactly find their desired information, a related search service that extracts search queries related to a search query inputted from a user and then returns them to the user has been provided. Normally, search results depend on search queries inputted by a user. For example, a search result obtained in response to an input "car" may be different from that obtained in response to another input "automobile" or "vehicle". Hence, users try to input a more highly related search query so as to obtain desired information, but it is not easy for users to hit on such search queries. Therefore, a recent search service offers, to users, related search queries in connection with user's search query input such that users can perform a search by using related search queries.

Meanwhile, in a conventional related search service, a service operator sorts related search queries one by one with regard to each search query and stores them in advance. Unfortunately, this causes temporal and financial burdens. Particularly, this conventional service is based on a way of collecting search queries inputted subsequently to a specific search query inputted by a user group and then finding a correlation between collected search queries regardless of users.

The above way is performed on the assumption that users already know suitable search queries for a search target. Thus, a conventional search service merely offers extended search keywords related to user's search query. Namely, a conventional search service collects search queries that contain user's search query itself or its synonym, and then provides them as related search keywords to a user.

Therefore, a conventional search service not only fails to provide related search keywords when a user does not know suitable search queries for a search target, but also fails to provide other search queries which contain neither user's search query nor synonym but have similar attributes. Hence, required is a more enhanced search query extracting method that can effectively collect data associated with a search query inputted from a user, exactly determine correlation between search queries on the basis of collected data, and thereby provide other search queries which are similar in attribute to user's search query.

BRIEF SUMMARY OF THE INVENTION

Accordingly, the present invention is to address the above-mentioned problems and/or disadvantages and to offer at least the advantages described below.

An aspect of the present invention is to provide an analogous query extracting system and method that can provide analogous queries which are similar in attribute to user's search query, especially by using search log information of a user device even in case where analogous queries do not contain user's search query or its equivalent.

According to one aspect of the present invention, provided is a system for extracting analogous queries. The system includes a search query extracting module configured to create a per-user search query DB by reading search queries inputted by users from a search log DB that contains user device identifiers, search queries inputted from user devices, and information about time when the users request a search; a query pair extracting module configured to create a per-user query pair DB by extracting, from the per-user search query DB, permutations of different two search queries among search queries inputted by a specific user; and an analogous query extracting module configured to read query pairs having a specific query in the per-user query pair DB, and to create analogous queries by extracting counterparts of a specific query from the query pairs, wherein the analogous queries are provided in response to a search request for a specific query from the user device.

The system may further include a similarity judgment module configured to read query pairs having the specific query in the per-user query pair DB, and to calculate a conditional probability of the specific query with regard to each query pair.

Additionally, the analogous query extracting system of this invention may be unified to a search system that uses the Internet.

According to another aspect of the present invention, provided is a method for extracting analogous queries. The method includes steps of creating a per-user search query DB by reading search queries inputted by users from a search log DB that contains user device identifiers, search queries inputted from user devices, and information about time when the users request a search; creating a per-user query pair DB by extracting, from the per-user search query DB, permutations of different two search queries among search queries inputted by a specific user; creating analogous queries by reading query pairs having a specific query in the per-user query pair DB and then by extracting counterparts of a specific query from the query pairs; and providing the analogous queries in response to a search request for a specific query from the user device.

In the method, the step of providing the analogous queries may include reading query pairs having the specific query in the per-user query pair DB, calculating a conditional probability of the specific query with regard to each query pair, selecting query pairs having the conditional probability greater than a given value, extracting all counterparts of the specific query from the selected query pairs, and providing the extracted queries as the analogous queries.

According to still another aspect of the present invention, provided is a computer-readable recording medium having thereon a program for executing the analogous query extracting method recited above.

A conventional related search service is useful when users desire to further find in detail their already known keywords, whereas the analogous query extracting system and method in this invention can provide search queries expected to attract user's attention even when a user does not know suitable keywords for a search target. Thus, this invention can promote user's convenience and search efficiency.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIG. 3 is a diagram illustrating an example of a per-user search query DB in accordance with an embodiment of the present invention, showing an example of database records each of which consists of a user device identifier and one or more search queries extracted from user's input queries according to a given criterion.

FIG. 4 is a diagram illustrating an example of a per-user query pair DB in accordance with an embodiment of the present invention, showing an example of database records each of which consists of a user device identifier and one or more query pairs having a permutation form of search queries extracted for each user.

DETAILED DESCRIPTION OF THE INVENTION

Exemplary embodiments of the present invention will now be described more fully with reference to the accompanying drawings. This invention may, however, be embodied in many different forms and should not be construed as limited to the exemplary embodiments set forth herein.

Figure 1:
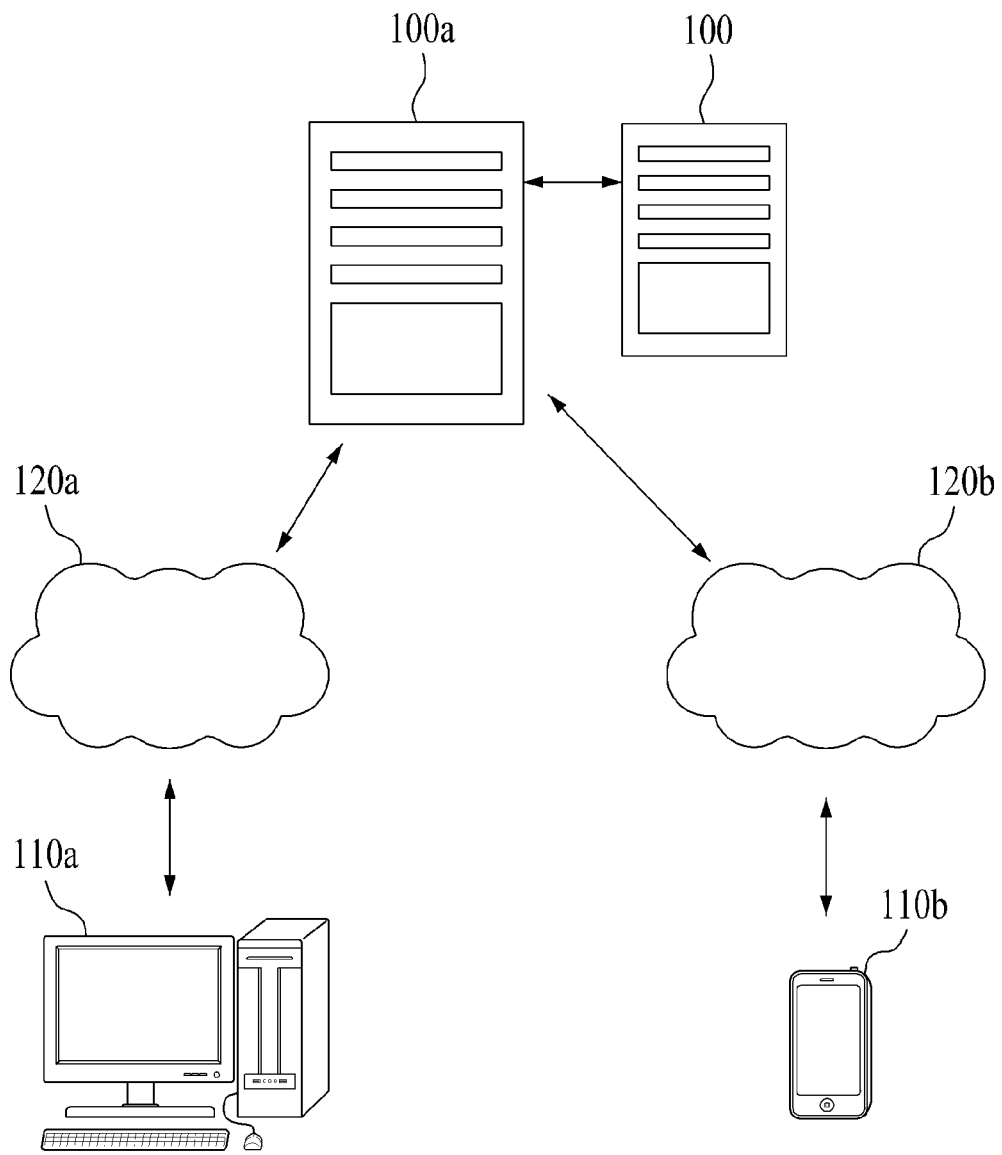
FIG. 1 is a schematic diagram illustrating a network connection of an analogous query extracting system in accordance with an embodiment of the present invention.

FIG. 1 is a schematic diagram illustrating a network connection of an analogous query extracting system in accordance with an embodiment of the present invention.

Referring to FIG. 1, each of user devices 110a and 110b accesses a search server 100a having an analogous query extracting system 100 through a wired or wireless communication network 120a or 120b and performs a search process. Namely, users enter keywords of their seeking information or data into the respective user devices 110a and 110b, which transmit them as search queries to the search server 100a. Then the search server 100a provides analogous queries to the user devices 110a and 110b together with or separately from search results. Analogous queries are keywords that the analogous query extracting system 100 creates based on the search queries. The analogous query extracting system 100 may be unified into the search server 100a that provides a web search service, or alternatively be constructed as a separate system which is physically apart from but communicates with the search server 100a through a certain communication network.

Figure 2:
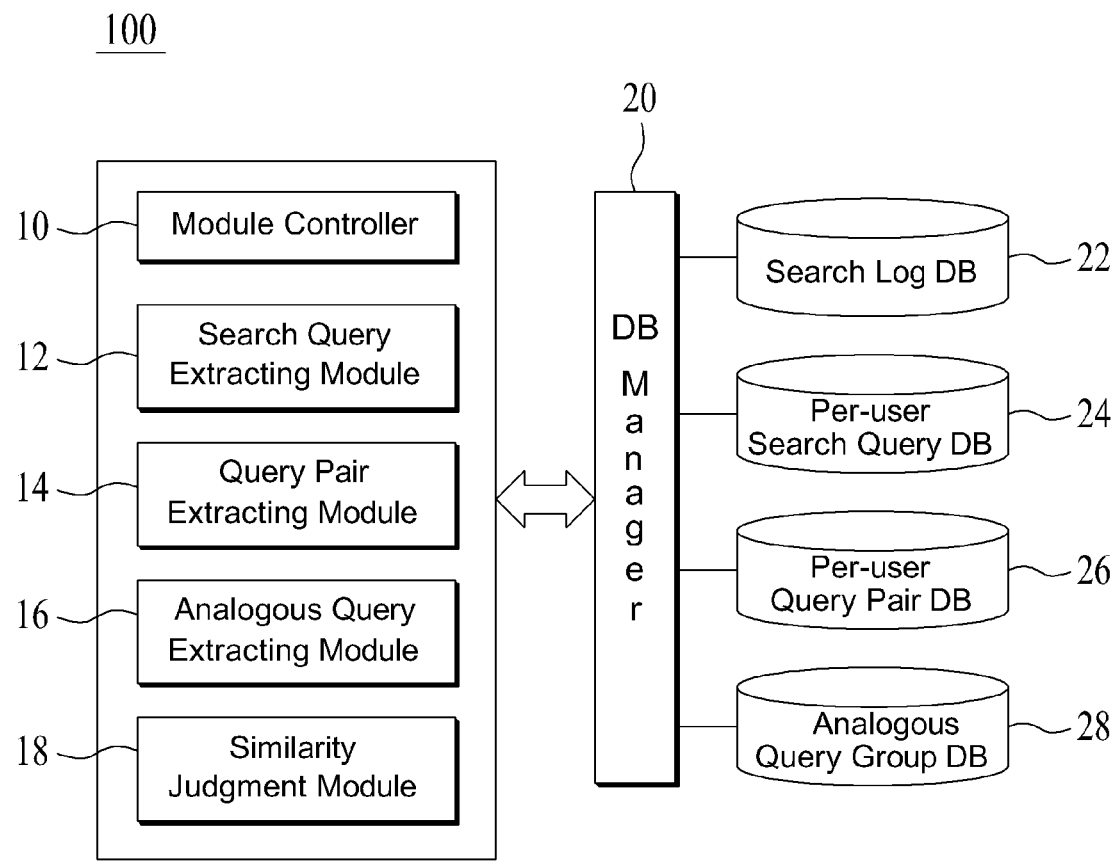
FIG. 2 is a block diagram illustrating the configuration of an analogous query extracting system in accordance with an embodiment of the present invention.

FIG. 2 is a block diagram illustrating the configuration of an analogous query extracting system in accordance with an embodiment of the present invention.

As shown in FIG. 2, the analogous query extracting system 100 may include a search query extracting module 12, a query pair extracting module 14 and an analogous query extracting module 16, and may further include a similarity judgment module 18. All of the search query extracting module 12, the query pair extracting module 14, the analogous query extracting module 16 and the similarity judgment module 18 are controlled by a module controller 10. Particularly, if the analogous query extracting system 100 is unified into the search server 100a, the module controller 10 may suitably control the respective modules 12, 14, 16 and 18 in response to instructions of the search server 100a. Although not illustrated in FIG. 2, the analogous query extracting system 100 may also include a certain communication module capable of communicating with the search server 100a when constructed at a place separated apart from the search server 100a.

Additionally, the analogous query extracting system 100 may include a search log DB 22, a per-user search query DB 24, a per-user query pair DB 26, and an analogous query group DB 28, all of which are controlled by a database manager 20.

When a user performs a search through the search server 100a by using the user device 110a or 110b, search log information is transmitted to the search server 100a. The search log information has information about identifiers formed of numbers or letters and used to identify the user device 110a or 110b, search queries inputted by a user, and information about time when a user requests a search. The search log information is stored as a database in the search log DB 22. If the analogous query extracting system 100 is unified into the search server 100a, the search log DB 22 may be shared with the search server 100a. If the analogous query extracting system 100 is constructed as a separate system, the search log DB 22 may be created using the search log information transmitted from the search server 100a. Additionally, in the search log DB 22, search queries inputted by a user and information about a search time are recorded together with a user device identifier (UID). A service operator may select search log information only about a particular user group, i.e., particular user device identifiers, and store it in the search log DB 22. Also, a service operator may sort search queries searched by users according to time information.

The search query extracting module 12 creates the per-user search query DB 24 with regard to individual users by reading search queries inputted by users and recorded in the search log DB 22. Specifically, the search query extracting module 12 may extract, based on the user device identifiers and search time information recorded in the search log DB 22, search queries repeatedly inputted by a particular user more than the given number of times within a specific time section (e.g., week, month, etc.), and thereby create the per-user search query DB 24. Namely, search queries that appear repeatedly within a specific time section are extracted and stored as database in the per-user search query DB 24. For example, as shown in FIG. 3, individual search queries A to Z repeatedly used by a user identifier UID X for a month may be stored as a record. A service operator may predefine, based on search time contained in the search log DB 22, a specific time section for creating the per-user search query DB 24. In addition, a service operator may predefine the number of repeated inputs of search queries and then exclude, from the per-user search query DB 24, search queries inputted less than the predefined number.

The query pair extracting module 14 creates the per-user query pair DB 26 by extracting, from the per-user search query DB 24, permutations of different two search queries among search queries inputted by a specific user. Namely, if the per-user search query DB 24 contains a plurality of search queries with regard to a specific user, each permutation consisting of different two search queries is created as one query pair. For example, as shown in FIG. 4, in case of a user identifier UID X, many query pairs each of which consists of two search queries selected from A to Z are created and stored as database in the per-user query pair DB 26. Since these query pairs for each user are arranged in the form of permutation, a processing speed for reading and extracting query pairs can be increased.

The system and method for extracting analogous queries in this invention have been developed on the assumption that users using a search service would periodically enter search queries which they were interested in, and that users would have an interest in at least two search queries which have a strong correlation therebetween. Hence, if it is possible to find search queries with high correlation among search queries inputted by users, queries having similar attributes regardless of users' search time can be joined as query pairs.

Based on the above assumption, the search query extracting module 12 extracts search queries repeatedly inputted by users within a specific time section and creates the per-user search query DB 24, and then the query pair extracting module 14 extracts, as query pairs, permutations of different two search queries inputted by each user. For example, if "sparrow" and "pigeon" are queries having similar attributes regardless of time in query pairs of a user identifier UID 1 shown in FIG. 4, there is a strong possibility that query pairs of other users have this query pair (sparrow, pigeon).

Thus, the analogous query extracting module 16 reads query pairs stored for respective users in the per-user query pair DB 26 and then calculates the frequency number of the same query pairs (namely, the number of user identifiers). This frequency number is compared with a threshold value (which may be predefined by a service operator). As the result of comparison, query pairs having the frequency number more than the threshold value are selected, and then from the selected query pairs, all counterparts of a specific query are extracted and designated as analogous queries. For example, if query pairs (A, B), (A, C) and (A, D) appear fifty times, thirty-five times and five times, respectively, in the query pair DB of all users, and if the threshold value is ten, two query pairs (A, B) and (A, C) having greater frequency numbers are selected, and one query (A, D) having lower frequency number is not selected. Then queries "B" and "C" which are counterparts of a specific query "A" are extracted as analogous queries. The extracted queries "B" and "C" are stored as analogous queries of a query "A" in the analogous query group DB 28. Thereafter, if there is a search request for a query "A" from a user device, queries "B" and "C" are provided to the user.

Meanwhile, when calculating the frequency number of a query pair, e.g., (A, B), the analogous query extracting module 16 may regard a query pair (B, A) as the same query pair. As discussed above, query pairs for each user are arranged in the form of permutation in the per-user query pair DB 26, and this increases a processing speed at the time of counting the frequency number of a query pair (A, B) or (B, A).

Additionally, the analogous query extracting system of this invention may further include the similarity judgment module 18 that reads query pairs having a specific query in the per-user query pair DB 26 and calculates the conditional probability of the specific query with regard to each query pair. Specifically, the conditional probability D of an analogous query "B" with regard to a specific query "A" is defined as follows.

$$D = P(A \cap B)/P(A) \qquad \text{[Equation 1]}$$

Here, P(A) represents the number of user identifiers having a search query "A", and P(A∩B) represents the number of user identifiers having both search queries "A" and "B". Thus, the conditional probability D of an analogous query "B" with regard to a specific query "A" means a probability that a user having a search query "A" will enter a search query "B".

When providing analogous queries created by the analogous query extracting module 16 in response to a search request for a specific query from the user device 110a or 110b, the similarity judgment module 18 reads query pairs having a specific query in the per-user query pair DB 26, calculates the conditional probability of the specific query with regard to each query pair, selects query pairs having the conditional probability greater than a given value, extracts all counterparts of a specific query from the selected query pairs, and provides the extracted queries as analogous queries.

Although in the above-discussed embodiment the similarity judgment module 18 provides analogous queries of a specific query by determining the similarity of queries on the basis of conditional probability, this is exemplary only and not to be considered as a limitation of the present invention. Alternatively, any other function may be used for determining the similarity of queries.

Through the above process, the analogous query extracting system of this invention can provide analogous queries which are similar in attribute to user's search query by using search log information of a user device even in case where analogous queries do not contain user's search query or its equivalent. For example, in case of user's search query "pork", Table 1 shows a list of analogous queries provided by the analogous query extracting system of this invention and a list of related queries provided by a conventional related search service. As shown in Table 1, a conventional search service merely offers related queries that contain user's search query "pork" or its synonym, whereas the analogous query extracting system and method of this invention can provide analogous queries which are similar in attribute to user's search query "pork" even in case where they do not contain user's search query or its equivalent.

TABLE 1

| Analogous query list in this invention | Related query list in conventional art |
| --- | --- |
| beef, chicken, livestock, farm products, Korean beef, pigs' feet, bacon, rice | pork shopping mall, pork price, pork efficacy, pork dish, pork parts, pork belly, imported pork, wholesale pork, pork sirloin, roast pork, pig farming |

The analogous query extracting method of this invention may include steps of creating a per-user search query DB by reading search queries inputted by users from a search log DB that contains user device identifiers, search queries inputted from user devices, and information about time when the users request a search, creating a per-user query pair DB by extracting, from the per-user search query DB, permutations of different two search queries among search queries inputted by a specific user, creating analogous queries by reading query pairs having a specific query in the per-user query pair DB and then by extracting counterparts of a specific query from the query pairs, and providing the analogous queries in response to a search request for a specific query from the user device. Furthermore, the step of providing the analogous queries may include reading query pairs having the specific query in the per-user query pair DB, calculating a conditional probability of the specific query with regard to each query pair, selecting query pairs having the conditional probability greater than a given value, extracting all counterparts of the specific query from the selected query pairs, and providing the extracted queries as the analogous queries.

The above-discussed analogous query extracting system may be implemented as program commands that can be executed by various computer means and written to a computer-readable recording medium. The computer-readable recording medium may include a program command, a data file, a data structure, etc. alone or in combination. The program commands written to the medium are designed or configured especially for the disclosure, or known to those skilled in computer software. Examples of the computer-readable recording medium include a hard disk, a CD-ROM, a DVD, and hardware devices configured especially to store and execute a program command, such as a ROM, a RAM, and a flash memory. The computer-readable recording medium can be distributed over a plurality of computer systems connected to a network so that processor-readable code is written thereto and executed therefrom in a decentralized manner. Programs, code, and code segments to realize the embodiments herein can be construed by one of ordinary skill in the art.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A system for extracting analogous queries, the system comprising:
    a database storage to store a plurality of databases; and
    a search server coupled to the database storage, the search server being configured to:
        create a per-user search query database in the database storage by reading search queries input by users from a search log database in the database storage that contains user device identifiers, search queries input from user devices, and information about time when the users request a search;
        create a per-user query pair database in the database storage by extracting from the per-user search query database permutations of different two search queries among search queries input by a specific user;
        read query pairs having a specific query in the per-user query pair database, and create analogous queries by extracting counterparts of the specific query from the query pairs;
        calculate a conditional probability D of the specific query with regard to each query pair, the conditional probability D comprising:

$$D=P(A\cap B)/P(A)$$

in which P(A) represents a number of user identifiers having a first search query A, and P(A∩B) represents a number of user identifiers having the first search query A and a second search query B, and
        provide analogous queries in response to a search request for the specific query; and
        select query pairs having the conditional probability D greater than a given value, extract all counterparts of the specific query from the selected query pairs, and provide the extracted queries as the analogous queries.

2. A method for extracting analogous queries, the method comprising:
    creating a per-user search query database by reading search queries input by users from a search log database that contains user device identifiers, search queries input from user devices, and information about time when the users request a search;
    creating a per-user query pair database by extracting from the per-user search query database permutations of different two search queries among search queries input by a specific user;
    creating analogous queries by reading query pairs having a specific query in the per-user query pair database, by extracting counterparts of the specific query from the query pairs by calculating a conditional probability D of the specific query with regard to each query pair, the conditional probability D comprising:

$$D=P(A\cap B)/P(A)$$

in which P(A) represents a number of user identifiers having a first search query A, and P(A∩B) represents a number of user identifiers having the first search query A and a second search query B;
        providing the analogous queries in response to a search request for the specific query; and
        selecting query pairs having the conditional probability D greater than a given value, extracting all counterparts of the specific query from the selected query pairs, and providing the extracted queries as the analogous queries.

3. A computer-readable recording medium having thereon a program for executing the analogous query extracting method recited in claim 2.

4. An article comprising: a non-transitory computer-readable medium having stored thereon instructions that, if executed, result in at least the following:
    create a per-user search query database in a database storage by reading search queries input by users from a search log database in the database storage that contains user device identifiers, search queries input from user devices, and information about time when the users request a search;
    create a per-user query pair database in the database storage by extracting from the per-user search query database permutations of different two search queries among search queries input by a specific user;
    read query pairs having a specific query in the per-user query pair database, and create analogous queries by extracting counterparts of the specific query from the query pairs;
    calculate a conditional probability D of the specific query with regard to each query pair, the conditional probability D comprising:

$$D=P(A\cap B)/P(A)$$

in which P(A) represents a number of user identifiers having a first search query A, and P(A∩B) represents a number of user identifiers having the first search query A and a second search query B, and
    provide analogous queries in response to a search request for the specific query; and
    select query pairs having the conditional probability D greater than a given value, extract all counterparts of the specific query from the selected query pairs, and prove the extracted queries as the analogous queries.

* * * * *